UNITED STATES PATENT OFFICE 2,369,516

TRISAZO-DYESTUFFS AND PROCESS OF MAKING SAME

Walter Anderau, Basel, Switzerland, assignor to Society of Chemical Industry in Basle, Basel, Switzerland No Drawing. Application April 1, 1942, Serial No. 437,282. In Switzerland April 3, 1941

11 Claims. (Cl. 260—173)

It has been found that valuable trisazo-dyestuffs can be obtained by coupling one mol. of the diazo compound of an aminoazo-dyestuff of the general composition

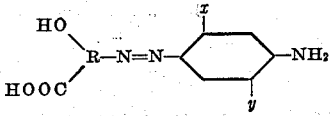

wherein R stands for an aryl radical containing the hydroxy and carboxylic acid groups in ortho-position to one another, $x$ stands for an alkyl or alkoxy group and $y$ stands for an alkoxy group, with one mol. of 5:5'-dihydroxy-2:2'-dinaphthylamine-7:7'-disulfonic acid, and then uniting one mol. of the diazo-dyestuff thus obtained with one mol. of the diazo compound of an arylamine of the general formula

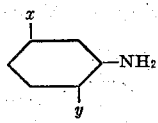

wherein $x$ and $y$ have the meaning given above.

The same dyestuffs are obtained by coupling first of all one mol. of the diazo-compound of an arylamine of the general formula

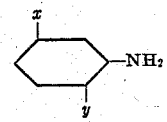

wherein $x$ and $y$ have the above given significance, with one mol. of 5:5'-dihydroxy-2:2'-dinaphthylamine-7:7'-disulfonic acid and then coupling one mol. of the monoazo-dyestuff thus obtained with one mol. of the diazo compound of an aminoazo-dyestuff of the general composition

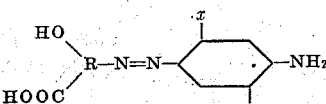

wherein R, $x$ and $y$ have the meaning indicated above.

As diazo components for the construction of the monoazo-dyestuff containing the salicyclic acid group may be used, for example, 2-hydroxy-5-amino-1-benzoic acid or 2-hydroxy-3-amino-1-benzoic acid, and as azo-component the 1-amino-2-alkoxy-5-alkyl- or -5-alkoxy-benzenes wherein the alkyl and alkoxy groups may contain one, two or more carbon atoms, but preferably not more than three. Such azo-components are 1-amino-2:5-dimethoxybenzene, 1-amino-2:5-diethoxy-benzene, 1-amino-2:5-dipropyloxy- or -diisopropyloxy benzene, 1-amino-2-ethoxy- or -propyloxy-5-methylbenzene and particularly 1-amino-2-methoxy-5-methylbenzene. As final components which are coupled with the disazo-dyestuffs obtained from the above monoazo-dyestuffs and 5:5'-dihydroxy-2:2'-dinaphthylamine-7:7'-disulfonic acid, there may also be used the components mentioned above, viz. 1-amino-2-alkoxy-5-alkyl- or -5-alkoxy-benzenes, for instance 1-amino-2:5-dimethoxy-benzene and particularly 1-amino-2-methoxy-5-methylbenzene.

Coupling with the 5:5'-dihydroxy-2:2'-dinaphthylamine-7:7'-disulfonic acid may be effected in usual manned in an alkaline medium, for example in a medium alkaline with sodium carbonate, sodium bicarbonate or ammonia.

The dyestuffs obtained by the present process dye cellulose fibers, such as cotton, linen, ramie, hemp, jute, etc. or fibrous materials from regenerated cellulose, such as viscose and copper rayon, as well as films, ribbons and similar articles from regenerated cellulose, chiefly reddish blue tints. Particularly valuable dyeings which are fast to washings are obtained if the dyeings are after-treated with agents yielding copper.

The treatment of the cellulose fibers dyed with the dyestuffs of the above composition in usual manner from a neutral or feebly alkaline bath, for instance alkaline with sodium carbonate, with agents yielding copper may be carried out with ordinary copper salts, such as copper sulfate, in a neutral or feebly acetic acid bath, or preferably with copper compounds stable towards alkalies, such as are obtained for example by the reaction of ordinary copper salts with aliphatic hydroxycarboxylic acids, such as tartaric acid, in an alkaline agent, for example an agent alkline with alkali carbonate. Dyeing processes in which such coppering agents are used have been described for example in U. S. Patents 2,148,659 and 2,185,905. The treatment with the agents yielding copper may be effected in the dyebath or in a fresh bath.

The following example illustrates the invention, the parts being by weight:

3 parts of 4-amino-2-methyl-5-methoxy-4'-hydroxy-3'-carboxy-1:1'-azobenzene are diazotized in usual manner and coupled with 4:6 parts of 5:5'-dihydroxy-2:2'-dinaphthylamine-7:7'-disulfonic acid in a solution alkaline with sodium carbonate, while cooling. The dyestuff formed is salted out, filtered, dissolved in water with addition of sodium carbonate, and the solution is coupled, after addition of some ice, with the diazo compound prepared from 1.3 parts of 1-amino-2- methoxy-5-methyl-benzene. When coupling is complete, the dyestuff of the probable formula

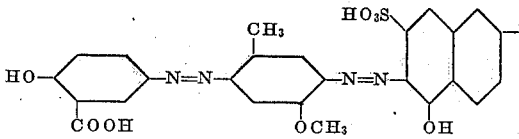

is salted out by addition of common salt, filtered and dried. It is a dark powder of bronze appearance which dissolves in concentrated sulfuric acid to a greenish blue solution, in water to a violet solution and dyes cotton reddish blue tints which, when treated with copper salts, become more greenish and are fast to washing and light.

A very similar dyestuff of somewhat greener tint is obtained by using 4-amino-2:5-dimethoxy-4'-hydroxy-3'-carboxy-1:1'-azobenzene as first diazo component and 1-amino-2:5-dimethoxy-benzene or 1-amino-2-methoxy-5-methylbenzene as second diazo component.

What I claim is:

1. Process for the manufacture of azo-dyestuffs, comprising coupling 5:5'-dihydroxy-2:2'-dinaphthylamine-7:7'-disulfonic acid, on the one hand, with a diazotized aminoazo-dyestuff of the general formula

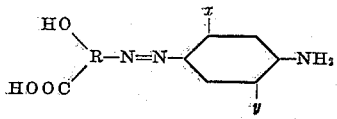

wherein R stands for a benzene radical containing the hydroxyl and carboxyl groups in ortho-position to one another, x stands for a member of the group consisting of alkyl and alkoxy groups containing up to three carbon atoms, and y stands for an alkoxy group containing up to three carbon atoms, and, on the other hand, with a diazotized amine of the general formula

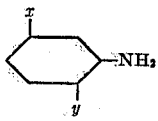

wherein x and y have the same meaning as given above.

2. Process for the manufacture of azo-dyestuffs, comprising coupling 5:5'-dihydroxy-2:2'-dinaphthylamine-7:7'-disulfonic acid, on the one hand, with a diazotized aminoazo-dyestuff of the general formula

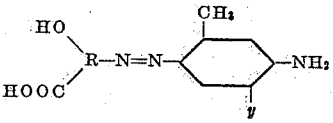

wherein R stands for a benzene radical containing the hydroxyl and carboxyl groups in ortho-position to one another, and y stands for an alkoxy group containing up to three carbon atoms, and, on the other hand, with a diazotized amine of the general formula

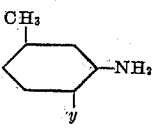

wherein y has the same meaning as given above.

3. Process for the manufacture of azo-dyestuffs, comprising coupling 5:5'-dihydroxy-2:2'-dinaphthylamine-7:7'-disulfonic acid, on the one hand, with a diazotized aminoazo-dyestuff of the general formula

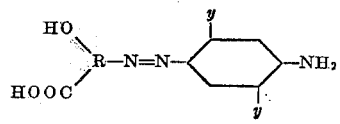

wherein R stands for a benzene radical containing the hydroxyl and carboxyl groups in ortho-position to one another, and y stands for an alkoxy group containing up to three carbon atoms, and, on the other hand, with a diazotized amine of the general formula

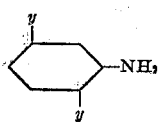

wherein y has the same meaning as given above.

4. Process for the manufacture of azo-dyestuffs, comprising coupling 5:5'-dihydroxy-2:2'-dinaphthylamine-7:7'-disulfonic acid, on the one hand, with a diazotized amine of the formula

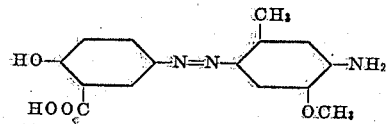

and, on the other hand, with a diazotized amine of the formula

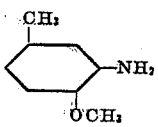

5. Process for the manufacture of azo-dyestuffs, comprising coupling 5:5'-dihydroxy-2:2'-dinaphthylamine-7:7'-disulfonic acid, on the one hand, with a diazotized amine of the formula

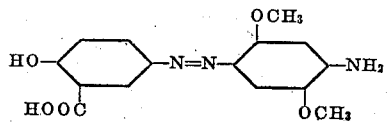

and, on the other hand, with a diazotized amine of the formula

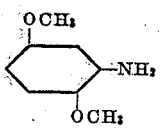

6. Azo-dyestuffs of the general formula

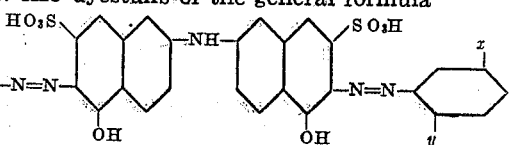

wherein R stands for a benzene radical containing the hydroxyl and carboxyl groups in ortho-position to one another, x stands for a member of the group consisting of alkyl and alkoxy groups containing up to three carbon atoms and y stands for an alkoxy group containing up to three carbon atoms.

7. Azo-dyestuffs of the general formula

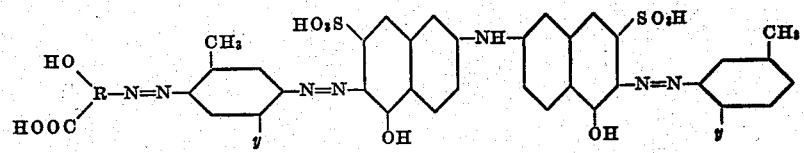

wherein R stands for a benzene radical containing the hydroxyl and carboxyl groups in ortho-position to one another, and y stands for an alkoxy group containing up to three carbon atoms.

8. Azo-dyestuffs of the general formula

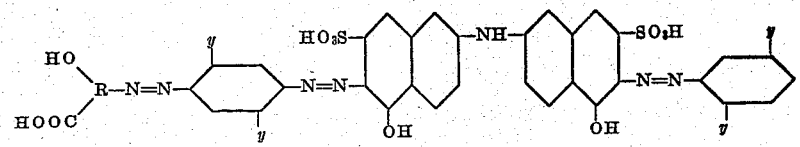

wherein R stands for a benzene radical containing the hydroxyl and carboxyl groups in ortho-position to one another, and y stands for an alkoxy group containing up to three carbon atoms.

9. The azo-dyestuff of the formula

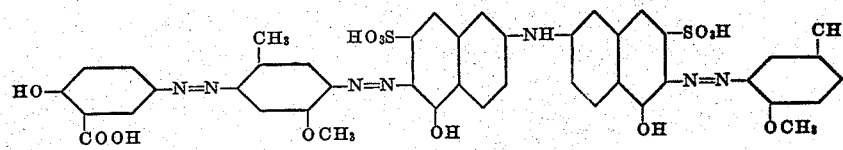

10. The azo-dyestuff of the formula

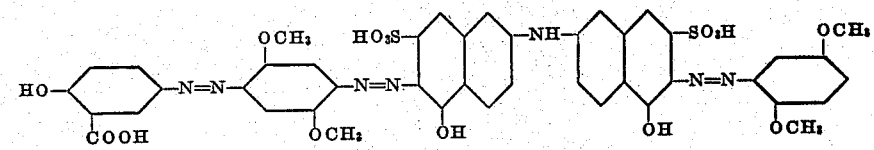

11. The azo-dyestuff of the formula

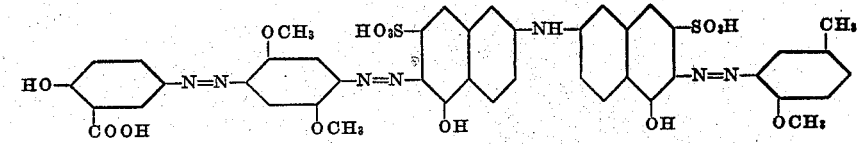

WALTER ANDERAU.